United States Patent [19]

Duggan, Sr.

[11] Patent Number: 5,127,080
[45] Date of Patent: Jun. 30, 1992

[54] PSEUDO-INTAGLIATED FIBER OPTIC PHOSPHOR SCREEN AND METHOD

[75] Inventor: Daniel D. Duggan, Sr., Roanoke, Va.

[73] Assignee: ITT Corporation, New York, N.Y.

[21] Appl. No.: 716,753

[22] Filed: Jun. 18, 1991

Related U.S. Application Data

[63] Continuation of Ser. No. 542,980, Jun. 25, 1990, abandoned.

[51] Int. Cl.⁵ .............................................. G02B 6/04
[52] U.S. Cl. .................................. 385/120; 385/116; 385/901
[58] Field of Search ..................... 350/96.24, 96.27

[56] References Cited

U.S. PATENT DOCUMENTS

| | | |
|---|---|---|
| 3,887,724 | 6/1975 | Diakides ................ 350/96.27 X |
| 4,654,558 | 3/1987 | Obata et al. ............ 350/96.27 X |
| 4,684,846 | 8/1987 | Duchenois et al. ...... 350/96.27 X |

Primary Examiner—John D. Lee
Assistant Examiner—Stephen W. Barns
Attorney, Agent, or Firm—Arthur L. Plevy; Patrick M. Hogan; Peter A. Abruzzese

[57] ABSTRACT

A fiber optic phosphor screen is made of an optical fiber bundle having individual fibers arranged in parallel with opposite ends thereof extending between internal and external surfaces of the screen. The ends of the individual fibers at the internal surface of the screen have phosphor islands bonded only to the core portions in order to provide a pseudo-intagliated phosphor layer. A reflective layer is coated over the phosphor islands in between on the cladding portions of the fibers. A method for producing the fiber optic phosphor screen includes the steps of applying a phosphor-photoresist layer to the ends of the fibers at the internal surface of the screen, illuminating the opposite ends of the fibers such that only the portions of the phosphor-photoresist layer on the core portions of the fibers are developed and bonded thereto, and removing the undeveloped portions of the phosphor-photoresist layer to leave behind phosphor islands bonded to the core portions.

6 Claims, 2 Drawing Sheets

PSEUDO-INTAGLIATED FIBER OPTIC PHOSPHOR SCREEN AND METHOD

This is a continuation of application Ser. No. 07/542,980, filed on Jun. 25, 1990, now abandoned.

FIELD OF THE INVENTION

The present invention relates to an improved phosphor screen, and particularly, to one having pseudo-intagliated layers of phosphor formed on a fiber optic assembly.

BACKGROUND OF THE INVENTION

Luminescent phosphor screens are used in cathode ray tubes, for example, television display tubes, electron display devices, imaging devices, for example, image intensifier tubes, etc. Typically, a thin layer of phosphor material containing a luminescence activator is supported on a substrate. The phosphor layer is activated by impingement of an electron beam, and the resulting luminescence is transmitted through the glass substrate to the front of the display.

Phosphor screens, such as those used in image tubes, are typically made with phosphor powders, such as ZnS:AgZnCdS:Ag. The powder is applied to a substrate glass plate by any one of several known methods, such as setting, brushing, spraying, etc. However, the combination of a powdered phosphor layer on a glass plate has a main drawback of low resolution and low light output due to the scattering of emitted light in lateral directions among the phosphor particles. Other disadvantages include low adherence to the substrate, requiring the use of binder which complicates the production process, and that the powder is difficult to apply uniformly, leading to low process yields of acceptable units.

One proposal has been to apply powdered phosphors into intagliated (etched) recesses or wells formed in the fiber cores of an optical fiber bundle in order to increase the resolution of the screen. Such an intagliated powdered-phosphor screen is described, for example, in "Intagliated Phosphor Screen Image Tube Project", by Richard J. Hertal, ITT Aerospace/Optical Division, prepared for NASA under Contract NAS5-26417, May 1982. As illustrated in FIG. 1, the intagliated phosphor screen 10 was formed by etching the ends of the cores 13 of the fibers 11 of an optical fiber bundle 10 to about a one-diameter (10 micron) depth, then packing phosphor powder 20 into individual etched wells 13a. The isolation of the phosphor into individual etched wells 13a prevented the lateral spread of light that occurs in a single continuous phosphor layer. The walls of the wells 13a along the cladding sheaths 12 of the fibers could be metallized to enhance the isolation effect. However, while the resolution of the phosphor screen was improved by the intagliated wells, the light output was quite low, even with metallization of the cladding walls, and the intagliated wells required a cumbersome etching process.

Another approach to improving the resolution of a phosphor screen is by deposition of the phosphor as a thin film or monocrystalline layer on a substrate. Such thin film phosphor screens have relatively high resolution, but have the disadvantage of large internal reflection losses. Due to a difference in refraction indices at the phosphor/substrate interface and the lateral waveguide effect of the thin film layer, the optical output for thin film phosphor screens have been only about 5% to 10% of the light emitted.

Some researchers have proposed etching grooves, trapezoidal mesas and other reticulated structures in the thin film phosphor layer and providing a reflection coating thereon, in order to break up the waveguide effect and enhance light output. Such reticulated structures are disclosed, for example, in U.S. Pat. No. 4,298,820 to Bongers et al., and in the article entitled "Reticulated Single-Crystal Luminescent Screen", by D. T. C. Huo and T. W. Hou, Journal of Electrochemical Society, Vol. 133, No. 7, pp. 1492-97, July 1986. The reticulated thin film structures have improved the light output of the resulting phosphor screen. However, they generally require high lithography resolution, and the crystalline phosphors tend to etch along crystalline planes which are different from the optimum light containing slope angle. Thus, the application of reticulated thin film phosphor layers has also been limited.

SUMMARY OF INVENTION

It is therefore a principal object of the invention to provide a phosphor screen of satisfactory resolution and brightness which can be easily produced without cumbersome etching procedures. It is a specific object to produce a fiber optic phosphor screen having separate islands of phosphor formed on the fiber ends, to obtain the enhanced light output from the intagliation effect, but without requiring etching of the fiber cores.

In accordance with the invention, a fiber optic phosphor screen comprises and optical fiber bundle made up of a plurality of individual fibers each having a core portion enclosed within a cladding portion, said individual fibers being arranged in parallel with opposite ends thereof extending between an internal surface and an external surface of the screen, wherein the ends of the individual fibers at the internal surface of the screen have the core portions spaced apart by and formed evenly to the same level as the cladding portions, a corresponding plurality of phosphor islands bonded to the ends of only the core portions of the respective individual fibers in order to provide a pseudo-intagliated phosphor layer at the internal surface of the screen, and a reflective layer coated over the phosphor islands on the core portions and over the cladding portions thereinbetween.

The invention also encompasses the method of producing the pseudo-intagliated fiber optic phosphor screen, which includes the steps of providing an optical fiber bundle of individual fibers having light-transmissive core portions enclosed within respective cladding portions and extending in parallel between an internal surface and an external surface of the screen, applying a phosphor-photoresist layer to the ends of the fibers at the internal surface of the screen, said phosphor-photoresist layer being made of a phosphor material mixed with a photoresist material which as a light-development characteristic of hardening and bonding to a substrate when exposed to light, illuminating the opposite ends of the fibers at the external surface of the screen, such that only those portions of the phosphor-photoresist layer disposed on the light-transmissive core portions of the fibers at the internal surface of the screen are developed and bonded to the core portions, removing the undeveloped portions of the phosphor-photoresist layer to leave behind phosphor islands bonded only the core portions, thereby producing a pseudo-intagliated phosphor layer at the internal surface of the screen, and coating a reflective layer over the phosphor islands on the core portions and over the cladding portions thereinbetween.

BRIEF DESCRIPTION OF THE DRAWINGS

The above objects and further features and advantages of the invention are described in detail below in conjunction with the drawings, of which.

DETAILED DESCRIPTION OF INVENTION

Figure 1:
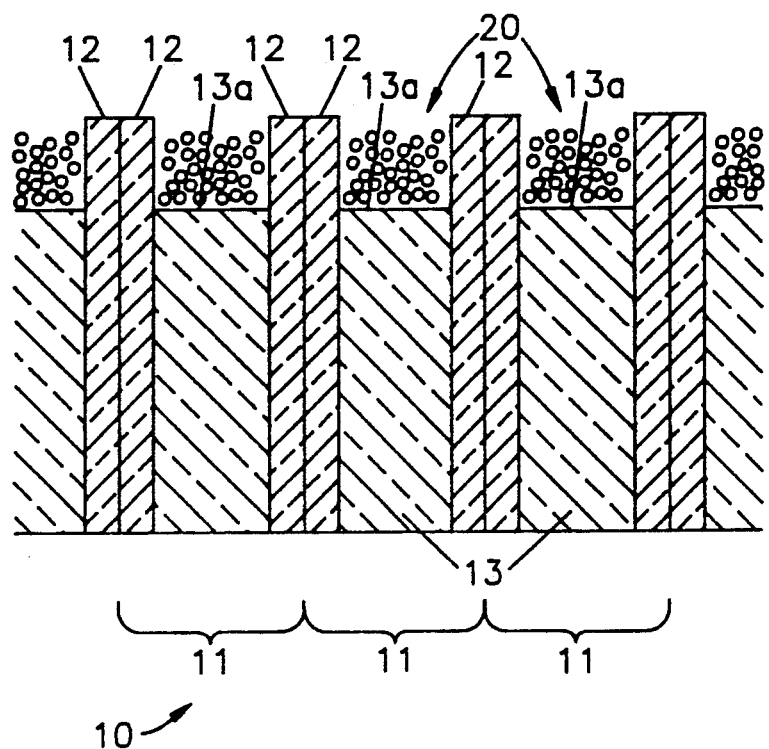
FIG. 1 is a diagram of a known intagliated fiber optic phosphor screen produced by etching wells in the fiber ends.
Figure 2:
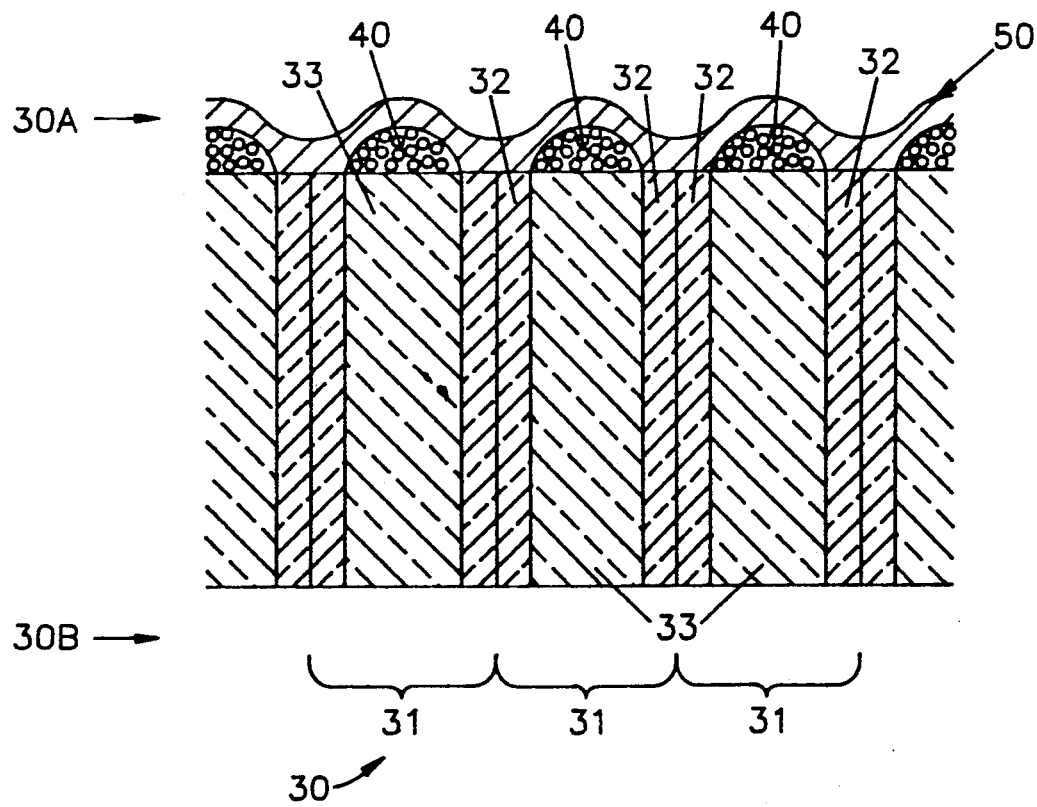
FIG. 2 is a diagram of a pseudo-intagliated fiber optic phosphor screen in accordance with the invention, in which phosphor islands are formed on the fiber cores by development of phosphor-photoresist material.

Referring to FIG. 2, a pseudo-intagliated fiber optic phosphor screen 30 in accordance with the invention has a fiber optic bundle of individual fibers 31, each having a core portion 33 enclosed within a cladding portion 32. The core portion is made of a light-transmissive glass material, whereas the cladding portion is made of a different glass or other material which is substantially opaque. The individual fibers 31 are arranged in parallel with their opposite ends extending between an internal surface 30A and an external surface 30B of the screen 30. The ends of the individual fibers 31 at the internal surface 30A of the screen have their core portions 33 separated by the cladding portions 32. The levels of the core and cladding portions are substantially even with each other. Phosphor islands are bonded to the ends of only the core portions 33 of the individual fibers.

The result is a pseudo-intagliated structure in which the phosphor islands are separated from each other so that light emitted therein is not scattered laterally. A reflective layer 50, e.g., an aluminum film, is coated or deposited over the phosphor islands 40 on the core portions 33 and over the cladding portions 32 in between the phosphor islands. The reflective layer serves to break up the light paths between the phosphor islands, and to reflect the light emitted therein into the core portions 33 for transmission to the external surface 30B of the screen.

Figure 3A:
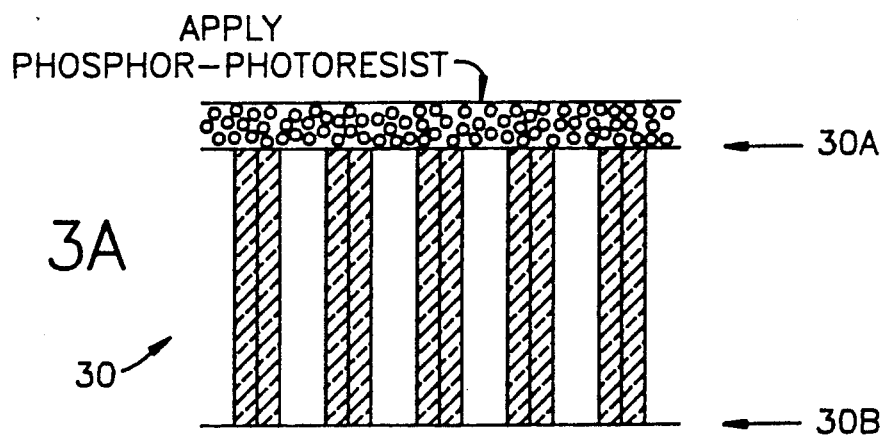
FIGS. 3A, 3B, 3C, and 3D illustrate a process for producing the phosphor screen in accordance with the invention.

The invention also encompasses the method of producing the pseudo-intagliated fiber optic phosphor screen, as illustrated in FIGS. 3A–3D. The ends of the fibers at the internal surface 30A of the screen 30 is formed or polished so that the core and cladding levels are smooth and flush with each other. In FIG. 3A, a phosphor-photoresist material is applied in an even layer over the internal surface 30A. The phosphor-photoresist material is a mixture of phosphor material evenly distributed in a photoresist material. The photoresist material has a light-development characteristic of hardening and bonding to a substrate when exposed to light. Any phosphor material that does not interfere with the photoresist development may be used. For example, a mixture of P-20 as a phosphor, and potassium dichromate polyvinyl alcohol (PVA) as a photoresist material were found to produce good results. P-20 is typically zinc cadmium sulfide employing a silver activator. It has a color of yellow green and is available from many sources, such as the General Electric Company.

Figure 3B:
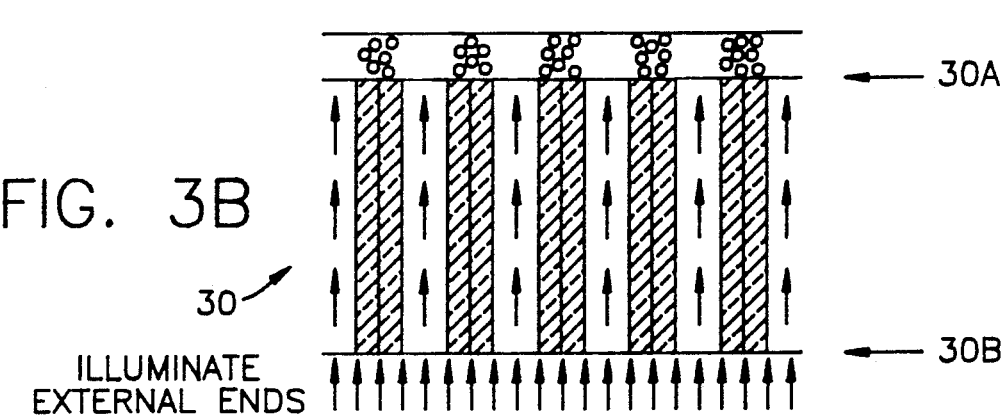

In the step of FIG. 3B, the ends of the fibers at the external surface 30B of the screen are exposed to illumination. The light is collimated by the light-transmissive core portions and directed toward the phosphor-photoresist material overlying the ends of the core portions at the internal surface. The exposure to light causes the photoresist material on the core portions to harden and bond to the core ends. The cladding portions do not transmit light, and the photoresist material thereon is not developed.

Figure 3C:
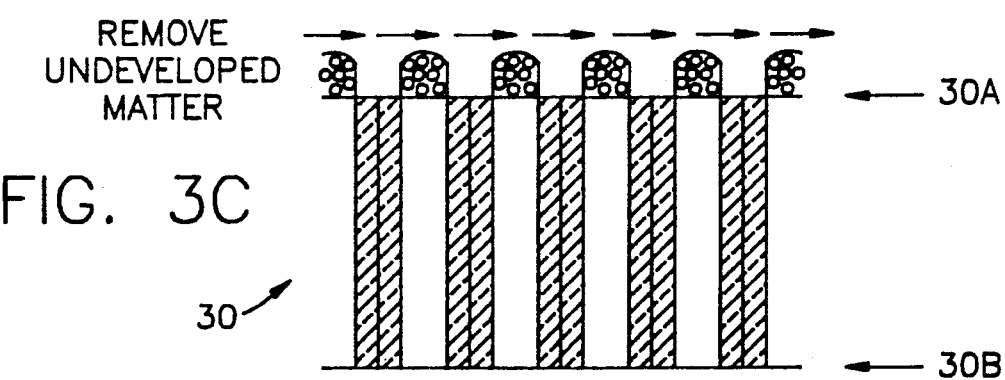
Figure 3D:
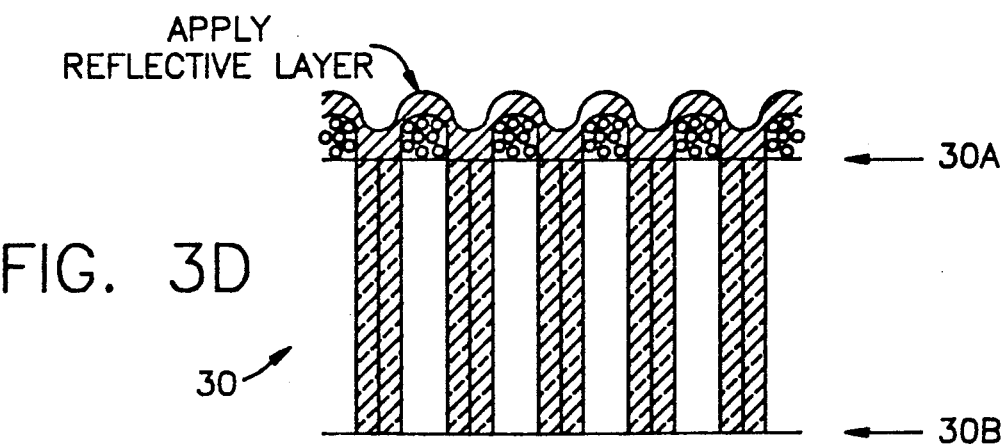

In the step shown in FIG. 3C, the undeveloped portions of the phosphor-photoresist layer on the cladding portions are removed by washing away with solvent. The result is the pseudo-intagliated phosphor layer at the internal surface 30A of the screen. The unit is finished by either floatation or spray lacquering. In the final step of FIG. 3D, a reflective metal layer, such as aluminum, is coated over the phosphor islands on the core portions and over the cladding portions in between.

The pseudo-intagliated fiber optic screen of the invention has a combination of several advantages over the prior phosphor screens. The reflective layer and separated phosphor islands reduces optical losses and produces an acceptable level of light output, e.g., 4 to 5 lumens/watt or more at 6 KV of operation in an image tube. The dimensions and spacing densities of the separate islands and optical fibers are selected in accordance with the desired screen resolution, and this resolution is maintained by the pseudo-intagliated structure. In addition, the phosphor screen can be readily fabricated by the relatively simple steps of applying, developing, and removing undeveloped photoresist material. No complex lithographic etching of the core ends or of a thin film phosphor layer is required to produce the intagliation effect of this structure.

The specific embodiments of the invention described herein are intended to be illustrative only, and many other variations and modifications may be made to thereto in accordance with the principles of the invention. All such embodiments and variations and modifications thereof are considered to be within the scope of the invention, as defined in the following claims.

I claim:

1. A method of producing a fiber optic phosphor screen, comprising the steps of:

providing an optical fiber bundle of individual fibers having light-transmissive core portions enclosed within respective cladding portions and extending in parallel between an internal surface and an external surface of the screen;

mixing a powdered phosphor material with a photoresist material such that the powdered phosphor material is evenly distributed in the photoresist material yielding a substantially homogeneous mixture, the photoresist material having a light development characteristic of hardening and bonding to a substrate when exposed to light;

applying the mixture to the ends of the fibers at the internal surface of the screen to form a phosphor-photoresist layer thereon;

illuminating the opposite ends of the fibers at the external surface of the screen, such that only those portions of the phosphor-photoresist layer disposed on the light-transmissive core portions of the fibers at the internal surface of the screen are developed and bonded to the core portions;

removing the undeveloped portions of the phosphor-photoresist layer to leave behind phosphor-photoresist islands bonded only to the core portions, thereby producing a pseudo-intagliated phosphor layer at the internal surface of the screen; and coating a reflective layer over the islands on the core portions and over the cladding portions therebetween.

2. A method of producing a fiber optic phosphor screen according to claim 1, wherein the fibers of the optical fiber bundle have a core portion of light-transmissive glass enclosed in a cladding portion of light-opaque glass.

3. A method of producing a fiber optic phosphor screen according to claim 1, wherein said reflective layer is an aluminum film coating.

4. A method of producing a fiber optic phosphor screen according to claim 1, wherein said phosphor-photoresist material includes a mixture of zinc cadmium sulfide as a phosphor, and potassium dichromate/PVA as a photoresist material.

5. A method of producing a fiber optic phosphor screen according to claim 1, wherein the spacing of said phosphor islands and individual fibers is selected in accordance with a desired optical resolution for said phosphor screen.

6. A method of producing a fiber optic phosphor screen according to claim 1, wherein said providing step includes polishing the fiber ends at the internal surface of the screen so that the core portions are smooth and flush with the cladding portions.

* * * * *